United States Patent
Khamis et al.

(10) Patent No.: US 10,073,890 B1
(45) Date of Patent: Sep. 11, 2018

(54) SYSTEMS AND METHODS FOR PATENT REFERENCE COMPARISON IN A COMBINED SEMANTICAL-PROBABILISTIC ALGORITHM

(71) Applicants: Mahmoud Azmi Khamis, Burbank, IL (US); Bruce Golden, Chicago, IL (US); Rami Ikhreishi, Raleigh, NC (US)

(72) Inventors: Mahmoud Azmi Khamis, Burbank, IL (US); Bruce Golden, Chicago, IL (US); Rami Ikhreishi, Raleigh, NC (US)

(73) Assignee: MARCA RESEARCH & DEVELOPMENT INTERNATIONAL, LLC, Burbank, IL (US)

( * ) Notice: Subject to any disclaimer, the term of this patent is extended or adjusted under 35 U.S.C. 154(b) by 423 days.

(21) Appl. No.: 14/756,121

(22) Filed: Aug. 3, 2015

(51) Int. Cl.
*G06F 7/00* (2006.01)
*G06F 17/30* (2006.01)
*G06N 7/00* (2006.01)

(52) U.S. Cl.
CPC .... *G06F 17/3053* (2013.01); *G06F 17/30554* (2013.01); *G06F 17/30598* (2013.01); *G06N 7/005* (2013.01)

(58) Field of Classification Search
CPC ......... G06F 17/30687; G06F 17/30684; G06F 17/30716; G06F 17/3053; G06F 17/30598; G06F 17/30289; G06F 17/30554; G06N 7/005
USPC ................ 707/748, 749, 758, 931, 728, 739
See application file for complete search history.

(56) References Cited

U.S. PATENT DOCUMENTS

| | | |
|---|---|---|
| 5,325,293 A | 6/1994 | Dorne |
| 5,774,833 A | 6/1998 | Newman |
| 6,021,403 A | 2/2000 | Horvitz et al. |
| 6,233,570 B1 | 5/2001 | Horvitz et al. |
| 6,533,724 B2 | 3/2003 | McNair |
| 6,601,055 B1 | 7/2003 | Roberts |
| 6,687,685 B1 | 2/2004 | Sadeghi et al. |
| 7,113,943 B2 * | 9/2006 | Bradford ........... G06F 17/30687 707/739 |
| 7,200,435 B2 | 4/2007 | Ricci et al. |
| 7,213,174 B2 | 5/2007 | Dahlquist et al. |
| 7,222,079 B1 | 5/2007 | Seare et al. |
| 7,249,040 B1 | 7/2007 | Binns et al. |
| 7,301,093 B2 | 11/2007 | Sater et al. |

(Continued)

FOREIGN PATENT DOCUMENTS

| | | |
|---|---|---|
| CN | 101625680 | 1/2010 |
| WO | WO2008137090 | 11/2008 |

OTHER PUBLICATIONS

Application and File History for U.S. Appl. No. 15/488,708, filed Apr. 17, 2017, inventors Khamis et al.

(Continued)

*Primary Examiner* — Md I Uddin
(74) *Attorney, Agent, or Firm* — Patterson Thuente Pedersen P.A.

(57) ABSTRACT

A comparison engine configured to utilize combined semantic-probabilistic algorithms to differentiate and compare an input to obtain enumerated results of similarity (items that are similar to other patent-related references), differences (items that are different from other patent-related references), and uniquenesses (how the input text is distinct from other patent-related references).

12 Claims, 9 Drawing Sheets

(56) References Cited

U.S. PATENT DOCUMENTS

| | | |
|---|---|---|
| 7,389,347 B2 | 6/2008 | Brodie et al. |
| 7,433,853 B2 | 10/2008 | Brockway et al. |
| 7,447,667 B2 | 11/2008 | Gong et al. |
| 7,472,121 B2 | 12/2008 | Kothari et al. |
| 7,529,685 B2 | 5/2009 | Davies et al. |
| 7,536,357 B2 | 5/2009 | Boyer et al. |
| 7,536,372 B2 | 5/2009 | Cox et al. |
| 7,555,438 B2 | 6/2009 | Binns et al. |
| 7,590,310 B2 | 9/2009 | Retterath et al. |
| 7,606,405 B2 | 10/2009 | Sawyer et al. |
| 7,624,030 B2 | 11/2009 | Feder et al. |
| 7,650,321 B2 | 1/2010 | Krishnan et al. |
| 7,669,871 B2 | 3/2010 | Watarai |
| 7,650,272 B2 | 11/2010 | Przytula et al. |
| 7,962,326 B2 | 6/2011 | Tsourikov et al. |
| 8,312,067 B2 | 11/2012 | Elias et al. |
| 8,459,680 B2 | 6/2013 | Chamberlain |
| 8,666,928 B2 | 3/2014 | Tunstall-Pedoe |
| 9,075,849 B2 | 7/2015 | Barney |
| 2002/0002474 A1 | 1/2002 | Michelson et al. |
| 2002/0082868 A1 | 6/2002 | Pories et al. |
| 2004/0250166 A1 | 12/2004 | Dahlquist et al. |
| 2005/0043922 A1 | 2/2005 | Weidl et al. |
| 2005/0049988 A1 | 3/2005 | Dahlquist et al. |
| 2005/0074834 A1 | 4/2005 | Chaplen et al. |
| 2005/0118557 A1 | 6/2005 | Sumner, II et al. |
| 2005/0234740 A1 | 10/2005 | Krishnan et al. |
| 2005/0246306 A1 | 11/2005 | Evans-Beauchamp et al. |
| 2007/0043761 A1 | 2/2007 | Chim et al. |
| 2007/0067281 A1* | 3/2007 | Matveeva et al. .. G06F 17/2715 |
| 2007/0118399 A1 | 5/2007 | Avinash et al. |
| 2007/0192143 A1 | 8/2007 | Krishnan et al. |
| 2008/0010522 A1 | 1/2008 | Uwatoko et al. |
| 2008/0020379 A1 | 1/2008 | Agan et al. |
| 2008/0033894 A1 | 2/2008 | Steck et al. |
| 2008/0209269 A1 | 8/2008 | Brodie et al. |
| 2008/0214928 A1 | 9/2008 | Rosales et al. |
| 2008/0243799 A1 | 10/2008 | Rozich et al. |
| 2008/0275731 A1 | 11/2008 | Rao et al. |
| 2009/0254328 A1 | 10/2009 | Chbat et al. |
| 2010/0324924 A1 | 12/2010 | Frederiksen |
| 2011/0301982 A1 | 12/2011 | Green et al. |
| 2012/0284200 A1 | 11/2012 | Pedersen |
| 2013/0138665 A1 | 5/2013 | Hu et al. |
| 2013/0282735 A1* | 10/2013 | Pedersen et al. ........................... G06F 17/30289 707/478 |
| 2013/0339202 A1 | 12/2013 | Zhao et al. |
| 2014/0032574 A1 | 1/2014 | Khan |
| 2015/0370901 A1 | 12/2015 | Sobeck et al. |
| 2015/0371203 A1 | 12/2015 | Plunkett et al. |
| 2017/0300470 A1 | 10/2017 | Khamis et al. |

OTHER PUBLICATIONS

Starc et al., "Joint learning of ontology and semantic parser from text", *Jozef Stefan International Postgraduate School, Slovenia*. Nov. 2015.

Collobert et al., "Natural Language Processing (Almost) from Scratch", *Journal of Machine Learning Research* 12 (2011) 2493-2537.

Collobert et al., "A Unified Architecture for Natural Language Processing: Deep Natural Networks with Multitask Learning", NEC Labs America. 2008.

Sheth et al., "Semantic Content Management for Enterprises and the Web" IEEE Internet Computing Jul./Aug. 2002.

Sierra et al., "Machine Learning inspired approaches to combine standard medical measures at an Intensive Care Unit", Dept. of Computer Science and Artificial Intelligence. 1999.

Sierra et al., "Bayesian networks in biomedicine and health-care", *Artificial Intelligence in Medicine* 2004.

Herskovits et al., "Applications of Bayesian Networks to Health Care", Technical Report NSI-TR-1997-02. Mar. 27, 1997.

Wang et al.,"$R^3$ Reinforced Ranker-Reader for Open-Domain Question Answering", School of Information System, Singapore Management University, Nov. 21, 2017.

"Google open-sources natural language understanding tools", http://www.kurzweilai.net/google-open-sources-natural-language-understanding-tools?utm_source=KurzweilAI+Daily+Newsletter& utm_campaign=018a562279-UA-946742-1& utm_medium=email&utm_term=0_6de721fb33-018a562279-282137525 May 11, 2016.

How Google Plans to Solve Artificial Intelligence. MIT Technology Review © 2018, as accessed on Feb. 13, 2018 https://www.technologyreview.com/s/601139/how-google-plans-to-solve-artificial-intelligence/#/set/id/601159/.

Teach Yourself Deep Learning with TensorFlow and Udacity. Google Research Blog. Jan. 21, 2016. Vanhoucke, Vincent https://research.googleblog.com/2016/01/teach-yourself-deep-learning-with.html.

Now AI Machines Are Learning to Understand Stories. MIT Technology Review. © 2018, as accessed on Feb. 13, 2018.

Colucci et al., "Concept abduction and contraction for semantic-based discovery of matches and negotiation spaces in an e-marketplace", Semantic Scholar. (2004) https://www.semanticscholar.org/search?q=semantic%20searching%20of%20e-discovery& sort=relevance.

How Meta's Literature Discovery Engine Works. © 2018, as accessed on Feb. 13, 2018. https://vimeo.com/144358069.

Lawmoose, Lawsaurus and Laugment, *What Comes After the Search Engine? Semantic Network-Based Lawyer Augmentation*, Jun. 25, 2015.

Kurzweil Accelerating Intelligence, *The Top A.I. Breakthroughs of 2015*, available at http://www.kurzweilai.net/the-top-ai-breakthroughs-of-2015?utm_source=KurzweilAI+Daily+Newsletter& utm_campaign=1057a4f9d8-UA-946742-1&utm_medium=email& utm_term=0_6de721fb33-1057a4f9d8-282137525, Dec. 29, 2015.

Application and File History for U.S. Appl. No. 14/756,121, filed Aug. 3, 2015, inventors Khamis et al.

Application and File History for U.S. Appl. No. 14/756,119, filed Aug. 3, 2015, inventors Khamis et al.

Journal of Ahima, American Health Information Management Association. © 2017, as accessed on Feb. 15, 2018. http://journal.ahima.org/.

Socher et al., Deep Learning for Natural Language Processing (without Magic)., 2013, as accessed on Feb. 15, 2018. https://nlp.stanford.edu/courses/NAACL2013/.

Berkely CS 188: Introduction of Artificial Intelligence, as accessed on Feb. 15, 2018.http://inst.eecs.berkeley.edu/~cs188/fall/lectures.html.

Healthcare IT News. © 2017, as accessed on Feb. 15, 2018 http://www.healthcareitnews.com/.

EHR Intelligence. © 2012-2018, as accessed on Feb. 15, 2018 https://ehrintelligence.com/.

HIT Consultant (HealthCare Technology) as accessed on Mar. 7, 2018. http://hitconsultant.net/.

TU Wien. Vienna University of Technology. (Dissertation "A Comparative Analysis of System Dynamics and Agent-Based Modelling for Health Care Reimbursement Systems", Oct. 2014. English abstract provided.

Capterra. Claims Processing Software as accessed on Feb. 26, 2018 https://www.capterra.com/claims-processing-software/.

Clark, Bloomberg Technology., "I'll be back: The Return of Artificial Intelligence", Feb. 3, 2015.

Iskandarani A novel approach to decision making of Mined Data using Dynamic Snapshot Pattern Recognition Algorithm (DS-PRA). TMLA. vol. 2, Issue 4. Publication date Aug. 3, 2014.

Innography, A CPA Global Company. Advanced Analytics as accessed on Feb. 28, 2018. © 2018 https://www.innography.com/why-innography/advanced-analytics.

Cascini. "Computer-Aided Innovation (CAI)", IFIP 20th World Computer Congress, Proceedings of the 2nd Topical Session of Computer-Aided, Innovation. Sep. 7-10, 2008.

(56) References Cited

OTHER PUBLICATIONS

Ye et al., Large Scale Text Analysis, "Electrical Engineering and Computer Sciences University of California at Berkeley". May 15, 2015. Tech Report No. UCB/EECS-2015-136.
Text Comparison Tools for Assisting with Patent Claims Analysis, Patinfomatics, LLC. © 2017 as accessed on Feb. 28, 2018 https://patinformatics.com/text-comparison-tools-for-assisting-with-patent-claims-analysis/.
Guo et al., "Ranking Structured Documents: A Large Margin Based Approach for Patent Prior Art Search", Department of Computer Science. 2009.
Harris et al., SpringerLink. "Using Classification Code Hierarchies for Patent Prior Art Searches". Abstract only. vol. 29 (2011).
Fu et al., "Design-by-analogy: experimental evaluation of a functional analogy search methodology for concept generation improvement" 2014.
http://www.intellogist.com/wiki/Compare:Patent_Search_System © 2009. Patent Search System.
Amazon Weblink to Costa-Jussa et al., "Hybrid Approaches to Machine Translation Theory and Applications of Natural Language Processing" 1$^{st}$ ed. 2016 edition https://www.amazon.com/Approaches-Translation-Applications-Language-Processing/dp/3319213105/ref=sr_1_11?s=books&ie=UTF8&qid=1456415245&sr=1-11&keywords=semantic+information+processing.
Amazon Weblink to Cardoso et al., "Semantic Keyword-based Search on Structured Data Sources: First Cost Action IC1302 International Keystone Conference, IKC 2015,Comibra, Portugal" 1$^{st}$ ed. 2015 Edition. https://www.amazon.com/Semantic-Keyword-based-Search-Structured-Sources/dp/3319279319/ref=sr_1_62?s=books&ie=UTF8&qid=1456415489&sr=1-62&keywords=semantic+information+processing.
Amazon Weblink to Lakshmi et al., "Computational Intelligence Techniques in Health Care" 1$^{st}$ed. 2016 Edition. https://www.amazon.com/Computational-Intelligence-Techniques-SpringerBriefs-Technology/dp/9811003076/ref=sr_1_8?s=books&ie=UTF8&qid=1456415083&sr=1-8&keywords=semantic+information+processing.
Amazon Weblink to Ionescu et al., "Knowledge Transfer between Computer Vision and Text Mining: Similarity-based learning approaches" (Advances in Computer Vision and Patterson Recogintion). 1$^{st}$ ed. 2016 Edition. https://www.amazon.com/Knowledge-Transfer-between-Computer-Vision/dp/3319303651/ref=sr_1_27?s=books&ie=UTF8&qid=1456415406&sr=1-27&keywords=semantic+information+processing.
Amazon Weblink to Supnithi et al., "Semantic Technology: 4th Joint International Conference", 2015$^{th}$ Edition (Nov. 9-11, 2014) https://www.amazon.com/Semantic-Technology-International-Conference-Thailand/dp/3319156144/ref=sr_1_2?s=books&ie=UTF8&qid=1456433017&sr=1-2&keywords=Semantic+Technology%3A+Joint+International+ Conference%2C+JIST+2015.
Moehrle et al., "Measuring textual patent similarity on the basis of combined concepts: design decisions and their consequences", Abstract. Published online Mar. 13, 2012.
Sweetwiki: A Semantic Wiki Abstract vol. 6, No. 1 (2008) http://www.websemanticsjournal.org/index.php/ps/article/view/138.
Sheth et al, "Semantic Content Management for Enterprises and the Web" (2002). IEEE Internet Computing.

\* cited by examiner

SYSTEMS AND METHODS FOR PATENT REFERENCE COMPARISON IN A COMBINED SEMANTICAL-PROBABILISTIC ALGORITHM

RELATED APPLICATION

This application is related to co-pending application Ser. No. 14/756,120, filed Aug. 3, 2015, entitled, "Systems and Methods for Semantic Understanding of Digital Information," which is fully incorporated herein in its entirety by reference.

TECHNICAL FIELD

Embodiments relate generally to collections of digital information including patent-related references, and more particularly, to systems and methods for semantically and probabilistically analyzing patent-related references.

COMPUTER PROGRAM LISTING APPENDIX

The following listing is a computer program listing appendix submitted herewith on compact disc (CD) in duplicate and incorporated by reference herein in their entirety. The total number of CDs is two; one CD labeled "Copy 1," and a duplicate CD labeled "Copy 2."

| Title | Size in Bytes | Date of Creation |
|---|---|---|
| automator.php.txt | 519 | 08/03/2015 10:59 am |
| sgmlparser.php.txt | 3,204 | 08/03/2015 10:59 am |
| template.php.txt | 20,329 | 08/03/2015 11:00 am |

BACKGROUND

In numerous patent-related fields, including patent application drafting, prior art searching, and patent application examination, comparison against a collection of patent and non-patent references is usefully and often. Traditionally, the comparison process is a manual process, whereby a researcher examines or reads an input text, and then manually searches for references related to that input text.

In the context of patent application drafting, an application drafter will often review the prior art in order to better frame the application for examination. In certain cases, an application drafter will conduct a review of the prior art before application drafting with only an invention disclosure. In other cases, or in combination, an application drafter will conduct a review of the prior art after preparing a draft of the application.

In the context of prior art searching, a patent searcher will review an invention disclosure or other input and conduct a review of prior art in the field. In other embodiments, a patent searcher can conduct a landscape search for a particular technology or field.

In the context of patent examination, patent examiners often classify the application then look for prior art references in the same field, then apply these prior art references to the application in order to determine if the application meets the requirements of being unique and non-obvious over the prior art references. Moreover, as the number of patent applications being filed continues to grow, there is a need for facilitating examination of applications.

In one example, described in U.S. Pat. No. 5,774,833 to Newman, entitled, "Method for syntactic and semantic analysis of patent text and drawings," a semantic and syntactic method of processing patent text is disclosed. Methods disclosed determine the meaning of the patent text in addition to an analysis of the grammar and punctuation of the patent text. This approach therefore identifies respective meaning of the text but does not derive nor extract the critical concepts found in the patent or its claims.

In another example, described U.S. Pat. No. 7,113,943 to Bradford, et al., entitled "Method for Document Comparison and Selection," describes methods and systems for searching a collection of documents for material of relatedness using a Latent Semantic Indexing (LSI) approach. Similarly, this approach does not obtain or extract the concepts found in the collection of documents in order to correlate or compare such concepts semantically to determine overall comparisons.

In another example, described in U.S. Pat. No. 9,075,849 to Barney, entitled, "Method and system for probabilistically quantifying and visualizing relevance between two or more citationally or contextually related data objects," a method for probabilistically quantifying a degree of relevance between two or more citationally or contextually related data objects is described. Data objects disclosed include patent documents, non-patent documents, reported case law, web pages, personal and corporate contacts information, product information, consumer behavior, technical or scientific information, and address information. Again, this approach does not extract the concepts of the data objects in order to perform a semantic comparison. As a result, systems and methods using this approach unable to determine overall semantic comparisons for the data objects.

Therefore, there is a need for systems and methods for semantically differentiating and comparing an input text against a collection of references to obtain similarities, differences, and uniqueness of the input patent.

SUMMARY

Embodiments described or otherwise contemplated herein substantially meet the aforementioned needs. For example, embodiments of a system are configured to extract the concepts found in an input (such as an input patent application) and a collection of references (for example, "prior art") and perform an exact, measurable, weighted semantic comparison. In addition, embodiments can be tuned to the found concepts in either the input or existing collection of references, thereby enabling a determination of the similarity, differences, and the uniqueness between the input and, for example, the collection of references, such as the prior art.

An embodiment comprises a processing engine configured to utilize combined semantic-probabilistic algorithms to differentiate and compare an input text to obtain enumerated results of similarity (items that are similar to other patent-related references), differences (items that are different from other patent-related references), and uniquenesses (how the input text is distinct from other patent-related references). Reference to input text herein can include text as well as figures and other suitable data, in embodiments. According to an embodiment, a processing engine utilizes Naïve Bayes (Bayesian) statistical probability in order to obtain the classification of the patent-related references and classify the input text. In further embodiments, the processing engine uses a semantic understanding algorithm to interpret the information contained in the patent-related references within the same category/classification to the input text. According to one embodiment, the semantics utilized are in the public domain. In embodiments, the processing engine is configured to conduct an analysis and subsequently display results related to the analysis. For example, similar items or concepts between the input text and the references can be displayed, as well as different items or concept between the input text and the references.

Embodiments can therefore be applied to the patent field to assist the application drafter, the patent searcher, the patent examiner, and others in the field to facilitate searching and subsequent understanding of patent-related references. In particular, classifications, differences, and uniquenesses between an input can be applied to a set of references such as existing patents or patent-related references, to output differences between the input and the existing set of references. In an embodiment, the output can be limited by classification of the input and/or existing set of references.

In an embodiment, a method for patent-related reference comparison comprises a combination of a probabilistic algorithm and a semantic algorithm to evaluate an input against patent-related references stored in a database to output the similarities and differences of the patent-related references that are in the same field or classification. In embodiments, the input comprises at least one of an input patent, an invention disclosure, a patent application, or patent application draft. In embodiments, the patent-related references against which the input is evaluated comprises a collection of so-called "prior art" relative to the input patent, invention disclosure, patent application, or patent application draft.

For example, in an embodiment of the method for patent-related reference comparison described above, the method begins with a preparation process. In an embodiment, the preparation process is invoked at an initial instance, and then again for every patent or patent-related reference added to the database. The preparation process is configured to process a set of patent-related references through a Naïve Bayes engine for statistical probability. A classification can be assigned to each of the existing patent-related references. Subsequently, the patent-related references are subjected to a semantic reading and understanding to determine a semantic classification. If there is a match of the classification results between two respective patent-related references, the classification is saved into an operably coupled memory or database along with all of the actual content of the respective patent-related reference. If the two classifications do not match, another categorization process can be executed that uses inheritance rules to determine which of the two classifications is a parent (Genus) and which is a child (Species). A final classification is then stored in the database and its hierarchy is stored in a knowledgebase to retain the relationship between the parent and child classifications in concordance with the patent-related reference contents. According to an embodiment, an inheritance structure of the grouping of the various categories can be merged with a semantic analysis, in order to facilitate concept extraction. In this manner, embodiments can accurately determine the categorization of both the input and the existing collection of references in order to facilitate a comparison.

According to an embodiment, a comparison process between the input and the database of patent-related references begins after the preparation process is complete. For example, once a new (non-classified) patent, patent application, invention disclosure, or other input is inputted to the process, the method utilizes a semantic reading and understanding to determine the semantic classification of the input.

After a semantic classification for the input has been completed, the method submits a query to the database for all patent-related references under that particular semantic classification. The database returns all appropriate patent-related references with their contents and classifications.

In an embodiment, the method is configured to then interface with the knowledgebase to compare the input to the database of patent-related references in a one-to-one basis. For example, in a comparison between an input comprising the same sections of a patent or patent application (Summary, Figures, Detailed Description of the Figures, Claims, etc.) and a classified existing patent-related reference, the method can iterate through these sections to find the differences between the input and the patent-related reference. In other embodiments, whole documents that do not include the patent sections mentioned above can be compared between input and patent-related references. In other embodiments, inputs or existing patent-related references can be read and relative sections can be determined based on the semantic determination of the content.

In an embodiment, the method can utilize an inference algorithm to determine any differences between the input and a respective patent-related reference. Further, a forward/backward chaining database can be utilized to determine any differences between the input and the respective patent-related reference. For example, the forward/backward chaining database can be generated by the inheritance rules and genus/species determination described herein. In an embodiment, the entire texts of the input and the respective patent-related reference are respectively compared. In other embodiments, portions are compared, such as the detailed description and claims.

The method can subsequently display results. For example, all of the applicable patent-related references that were compared against the input in the comparison process can be displayed. In embodiments, any similarities and differences between the input and the existing patent-related references can be displayed.

In an embodiment, the display process can comprise an automated weighing of the related comparable sections of the input and the extant patent-related references. Weighting provides an automated mechanism by which to adapt to the content of the input or existing reference. For example, the display process can determine which methods, processes, or content have the most advantageous or non-advantageous weight in evaluating the uniqueness of the input. In embodiments, multiple automated evaluations can be utilized in order to determine a proper evaluation criteria or weighting.

In another embodiment, weighting can be implemented in a process including manual input or steps. For example, weighting can be implemented in a manual fashion for the user to tune the terms or evaluate content based on the meaning of the sentences. In such weighting, a higher value can be placed on certain content or algorithms to output a uniqueness value of the input.

According to embodiments, a separate algorithm or sub-process can be instantiated or launched that performs a semantic search related to the input. For example, a semantic search related to the input can be conducted in two steps. An initial step can comprise conducting a generalized search engine or public databases search for keywords and/or concepts contained in the input. A subsequent step can comprise filtering the concepts and information in the input and the existing patent-related references, then conducting searches for those meanings. After obtaining results of the semantic search, results can be examined by the semantic engine to extract the concepts found in the resulting references. Matching results are then processed by the comparison process described above.

In a feature and advantage of embodiments, hardware systems can implement the methods for patent-related reference comparison described herein. Systems can include one or more processors and memory operably coupled to the one or more processors, wherein the one or more processors is operably coupled to at least one database, the database comprising a set of patent-related references. The one or more processors can include control logic for implementing the methods described herein.

The above summary is not intended to describe each illustrated embodiment or every implementation of the subject matter hereof. The figures and the detailed description that follow more particularly exemplify these embodiments.

BRIEF DESCRIPTION OF THE DRAWINGS

Subject matter hereof may be more completely understood in consideration of the following detailed description of various embodiments in connection with the accompanying figures, in which.

Figure 1:
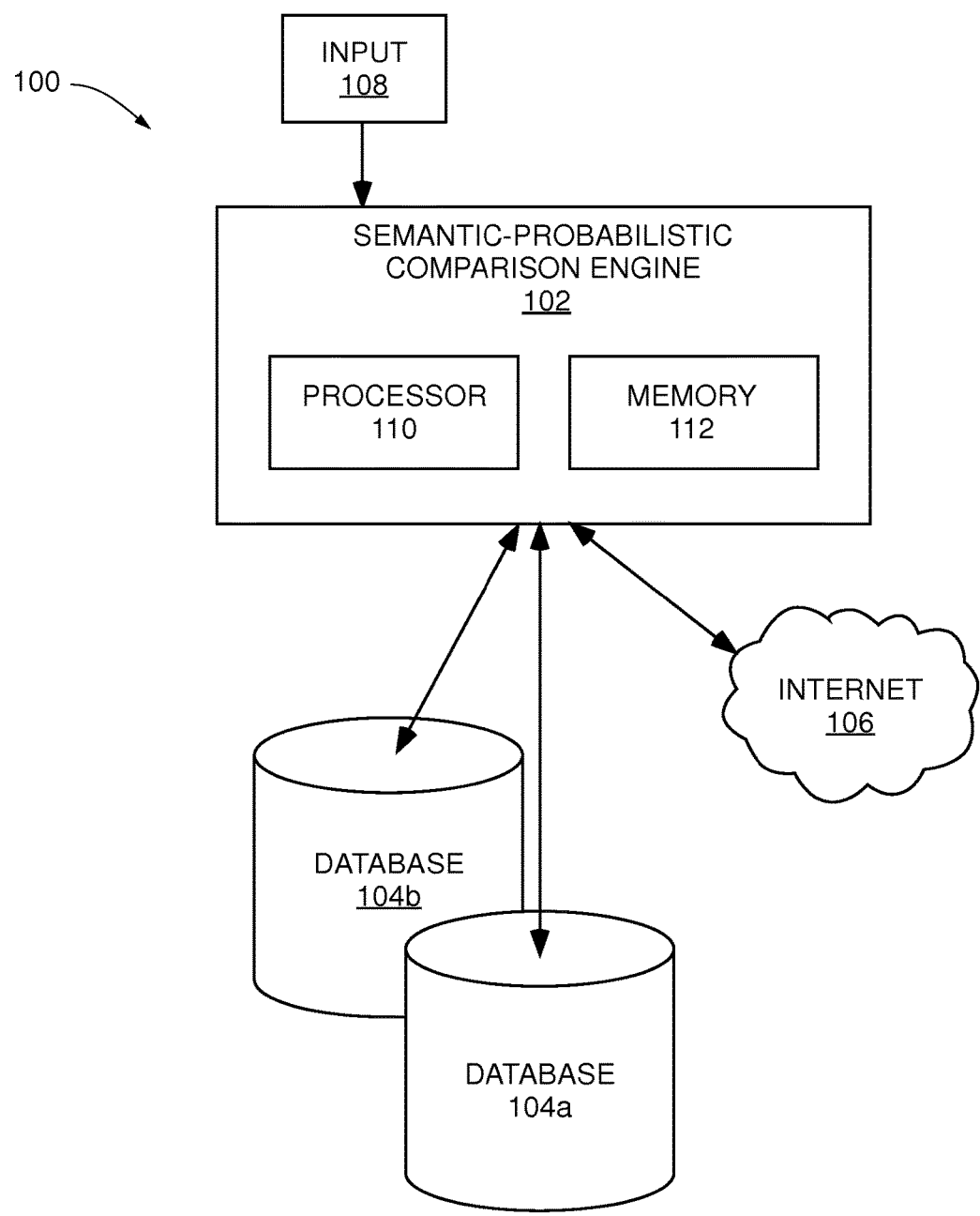
FIG. 1 is a block diagram of a patent-related reference comparison system, according to an embodiment.

While embodiments are amenable to various modifications and alternative forms, specifics thereof have been shown by way of example in the drawings and will be described in detail. It should be understood, however, that the intention is not to limit subject matter hereof to the particular embodiments described. On the contrary, the intention is to cover all modifications, equivalents, and alternatives falling within the spirit and scope of subject matter hereof in accordance with the appended claims.

DETAILED DESCRIPTION OF THE DRAWINGS

Referring to FIG. 1, a block diagram of a system 100 for semantically and probabilistically analyzing patent-related references is depicted, according to an embodiment. System 100 generally comprises a semantic-probabilistic comparison engine 102 and one or more databases 104.

The system includes various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

According to an embodiment, the components of semantic-probabilistic comparison engine 102 can be located in a singular "cloud" or network, or spread among many clouds or networks. End-user knowledge of the physical location and configuration of components of comparison engine 102 is not required. In an embodiment, comparison engine 102 generally includes processor 110 and memory 112. Comparison engine 102 embodies the computation, software, data access, and storage services that are provided to users over a network.

Comparison engine 102 generally includes processor 110 and memory 112. Processor 110 can be any programmable device that accepts digital data as input, is configured to process the input according to instructions or algorithms, and provides results as outputs. In an embodiment, processor 110 can be a central processing unit (CPU) configured to carry out the instructions of a computer program. Processor 110 is therefore configured to perform at least basic arithmetical, logical, and input/output operations.

Memory 108 can comprise volatile or non-volatile memory as required by the coupled processor 112 to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

As depicted in FIG. 1, system 100 comprises a first database 104a and a second database 104b. However, one skilled in the art will readily appreciate that additional or fewer databases can be utilized. As depicted in FIG. 1, comparison engine 102 can interface with databases 104 via processor 110. Specifically, processor 110 can execute database-specific calls to store and retrieve data from databases 104. Each of databases 104 can each comprise any organized or non-organized collection of data. In embodiments, databases 104 can each comprise simple non-volatile memory as part of a computer. In embodiments, databases 104 can each comprise database management systems such as Oracle, IBM DB2, or Microsoft SQL Server, for example. In embodiments, each of databases 104 comprises a plurality of databases.

In an embodiment, database 104a comprises an unorganized collection of patent-related references, such as U.S. and foreign patents, U.S. and foreign published patent applications, textbooks, online articles, technical magazines, and the like. For example, database 104a can comprise the USPTO's "Pat FT database" that contains all U.S. patents issued since 1790.

In an embodiment, database 104b comprises a set of organized patent-related references. For example, database 104b can comprise the set of unorganized references from database 104a organized and classified as described herein. In further embodiments, database 104b comprises a notation to the reference, classification of the reference, along with all of the actual content of the respective patent-related reference. In an embodiment, database 104b can further comprise a knowledgebase comprising storage for a plurality of hierarchy data to store the relationship between parent and child classifications in accordance with the reference contents. In still other embodiments, system 100 can comprise another database for knowledgebase storage.

In embodiments, as depicted in FIG. 1, system 100 further comprises an operably coupled network connection to the Internet 106. In other embodiments, instead of Internet 106, connection to a network can be to any suitable network containing data relative to system 100. In embodiments, as will be described, Internet 106 can be semantically searched for patent-related information, which can be inputted back to components of comparison engine 102.

System 100 further comprises input 108. In an embodiment, input 108 generally comprises text, figures and suitable data for operation of a classification and comparison, as will be described. For example, input 108 can comprise at least one of an input patent, an invention disclosure, a patent application, or patent application draft.

Though not depicted in FIG. 1, it is readily understood that comparison engine 102 and/or its subcomponents comprise input/output controllers and hardware including one or more network interface devices for interfacing to networked hardware such as databases 104 and Internet 106. In embodiments, one or more communication channels can therefore operably couple comparison engine 102 to one or more of databases 104. The communication channels can be wired or wireless and be implemented according to any suitable protocol, such as Internet Protocol (IP), Wi-Fi, or any other appropriate format for the respective application.

Figure 2:
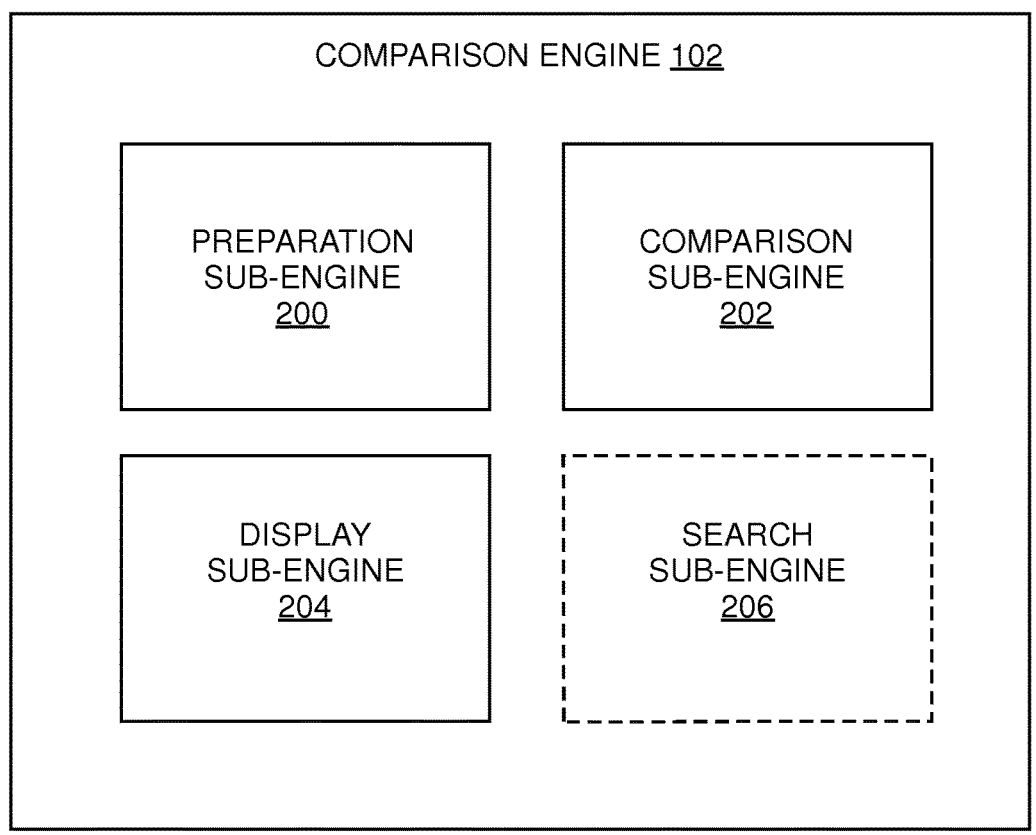
FIG. 2 is a block diagram of a comparison engine, according to an embodiment.

Referring to FIG. 2, a block diagram of a comparison engine 102 is depicted, according to an embodiment. Comparison engine 102 is generally configured to compare an input to a database of existing references semantically and statistically to obtain similarities and differences between the input and the existing references. Comparison engine 102 generally comprises a preparation sub-engine 200, a comparison sub-engine 202, a display sub-engine 204, and an optional search sub-engine 206.

Preparation sub-engine 200 is generally configured to obtain available patent-related references and classify the references. In an embodiment, preparation sub-engine 200 is configured to obtain all available U.S. and international patents and published patent applications in full text, including description, summary, claims, and figures. In other embodiments, preparation sub-engine 200 is further configured to obtain non-patent literature documents such as textbooks, online articles, technical magazines, and the like.

In embodiments, preparation sub-engine 200 is configured to process the references first according to a statistical probability classification. For example, a Bayesian algorithm can be utilized for patent classification training. In an embodiment, a Naïve Bayes algorithm is trained. Preparation sub-engine 200 is therefore configured to use statistical probability to classify the references into groups in a first classification.

In an embodiment, preparation sub-engine 200 is further configured to process the references according to a semantic evaluation. For example, preparation sub-engine 200 is configured to read the references and group them according to categories defined by the semantic evaluation. Preparation sub-engine 200 is therefore configured to use semantic understanding to classify the references into groups in a second classification.

Preparation sub-engine 200 is further configured to compare the first classification generated by the Bayesian algorithm and the second classification generated by the semantic evaluation.

Preparation sub-engine 200 is further configured to use inheritance rules to determine a parent (genus) and child (species) classification from the first classification and second classification that were obtained by the statistical probability classification and the semantic understanding classification described above.

Preparation sub-engine 200 is further configured to store the parent and child classification and a logical relation of the parent classification into a knowledgebase. In an embodiment, referring to FIG. 1, the knowledgebase can comprise memory 112. In an embodiment, the knowledgebase can comprise a portion of database 104b, or a separate database storage. In an embodiment, preparation sub-engine 200 further comprises a linking process to relate the relative reference to the classification.

Comparison sub-engine 202 is generally configured to initially classify the input. In an embodiment, comparison sub-engine 202 utilizes a semantic reading or parsing and evaluation similar to that done for each of the set of patent-related references. Therefore a classification of the input is therefore determined.

Comparison sub-engine 202 is further configured to retrieve all of the references that are classified and stored in the operably coupled database having the same classification as the input.

In an embodiment, comparison sub-engine 202 interfaces with the knowledgebase to obtain the inheritance of the classifications for the references that are within the same classification of the input.

Further, comparison sub-engine 202 comprises an inference engine configured for forward/backward chaining to determine the differences between the sections (for example, description, summary, and claims, etc.) between the input and each of the existing references in the same classification (category).

Display sub-engine 204 is generally configured to display the results of the operations executed by preparation sub-engine 200 and comparison sub-engine 202. In an embodiment, display sub-engine 204 comprises execution instructions to display the selected patent-related references that have the same classification as the input. In an embodiment, display sub-engine 204 further comprises execution instructions to display the differences and similarities for the input for each respective patent-related reference. For example, resultant similarities, differences, and uniquenesses can be displayed using two formats (as will be described additionally with respect to FIGS. 6-7). First, a numerical value can be shown, such as the percentage in similarity/difference/uniqueness between the input and a reference. Second, grouped concepts and sentences taken from the actual input can be displayed. Such an output illustrates how certain sentences are similar and/or different.

Optionally, as shown in FIG. 2, comparison engine 102 can further comprise search sub-engine 206. In an embodiment, search sub-engine 206 is generally configured to search for and generate key words contained in the input. Search sub-engine 206 is further configured to conduct a meaning search. In embodiment, a meaning search comprises translating a word or a sentence into other words, including definitions and synonyms and subsequently conducting an overall search for the entire aspect of the resulted search terms. Embodiments can also include searching for a broader range including the categories that the search terms would fall under. In other embodiments, key concepts or key words are generated or otherwise identified. The generated key words and synonyms and meanings can be utilized in the final search filter. For example, keywords are the words with the highest weighting score in the semantic engine. Therefore, such keywords 'carry' the most weight of the sentence, which in turn define the meaning of the sentence.

Search sub-engine 206 is further configured to transmit or otherwise pass the generated key words, synonyms, and/or meanings to preparation sub-engine 200 for concept extraction in relation to the reference. In an embodiment, comparison sub-engine 202 is subsequently invoked for comparison process.

Figure 3:
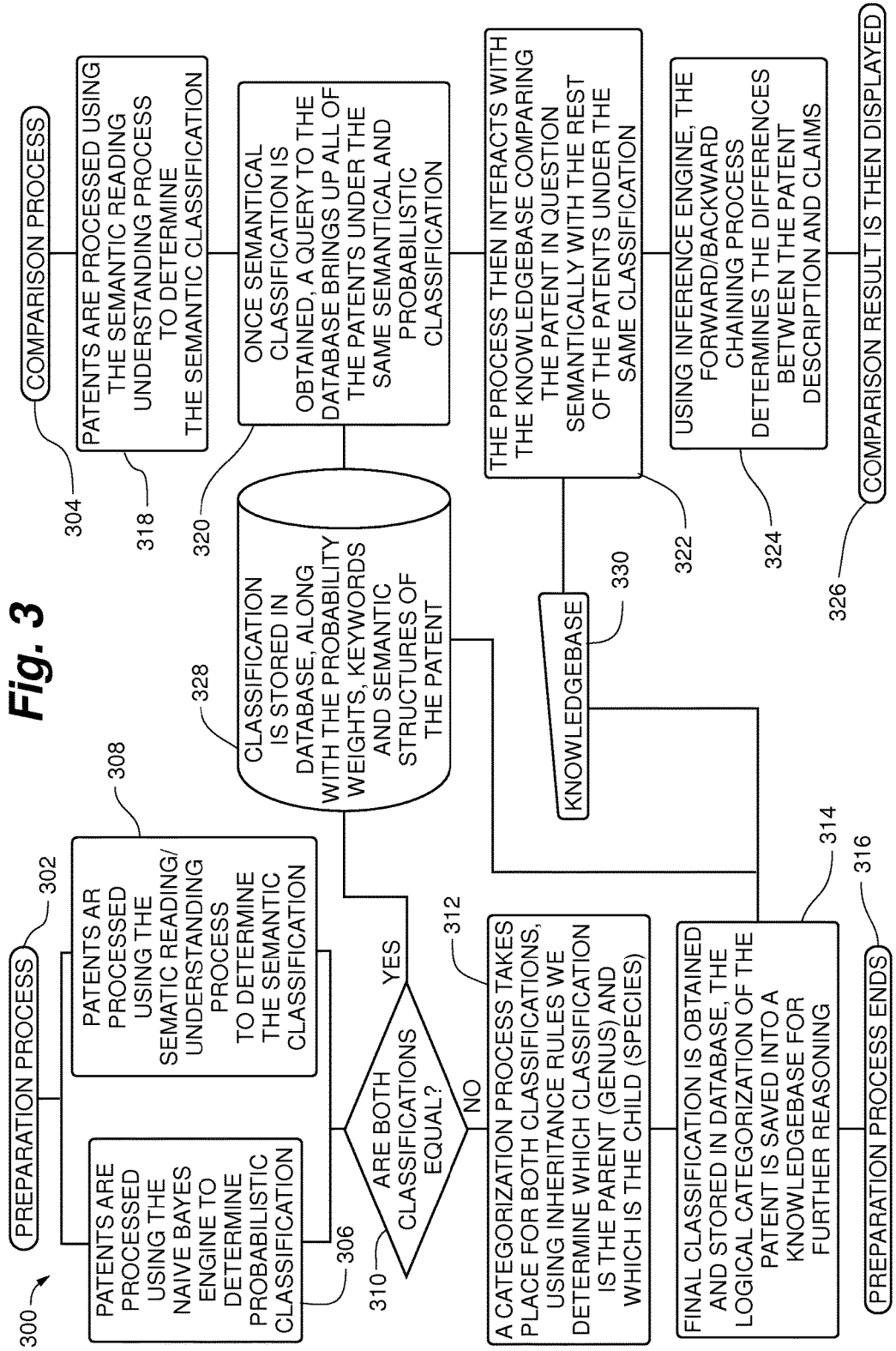
FIG. 3 is a flowchart of a method for comparing patent-related references, according to an embodiment.

Referring to FIG. 3, a flowchart of a method 300 for comparing patent-related references is depicted, according to an embodiment. Method 300 generally comprises a preparation sub-process 302 and a comparison sub-process 304. Reference to "patents" in FIG. 3 is shorthand and can include U.S. and international patents and published patent applications, non-patent literature documents such as textbooks, online articles, technical magazines, and the like, and any other appropriate "patent-related" reference. In embodiments, the references included are potential "prior art" references to an input, as will be discussed with respect to comparison process 304. Reference to "patent in question" in FIG. 3 is shorthand for "input" and can comprise at least one of an input patent, an invention disclosure, a patent application, or patent application draft, or any other suitable input for comparison against the set of patent-related references prepared in preparation process 302.

Referring first to preparation sub-process 302, preparation sub-process 302 generally comprises steps 306-316 with interfaces to database classification storage 328 and knowledgebase 330.

Figure 4:
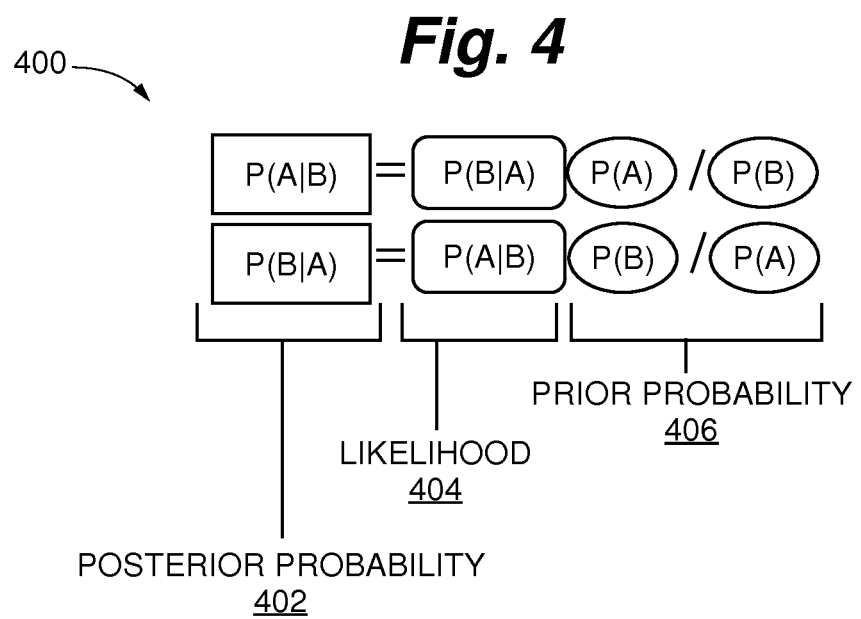
FIG. 4 is a diagram of Bayesian logic theory for obtaining probability in a method for comparing patent-related references, according to an embodiment.

For example, preparation sub-process 302 comprises a probabilistic classification at 306 and a semantic classification at 308. Referring to probabilistic classification at 306, in an embodiment, each of the patent-related references are processed using a Naïve Bayes engine to determine a probabilistic classification. Referring to FIG. 4, a diagram of Bayesian logic theory 400 for obtaining probability in method 300 for comparing patent-related references is depicted, according to an embodiment. In an embodiment, references are processed at 306 using a Naïve Bayes engine to determine a probabilistic classification. Bayesian logic theory 400, as depicted in FIG. 4, comprises a posterior probability 402 as defined by a likelihood 404 and a prior probability 406. FIG. 4 therefore illustrates the Bayesian logic for calculating the probability of a set of features. Embodiments therefore define the confidence level of two sets of information.

Referring again to FIG. 3, at 308, a semantic classification is conducted. Patent-related references are processed using a semantic parsing or "reading." In an embodiment, a semantic understanding algorithm processes each of the patent-related references to determine a semantic classification.

At 310, a decision point is reached to determine whether the probabilistic classification at 306 and the semantic classification at 308 are equal. If the probabilistic classification at 306 and the semantic classification at 308 are not equal, method 300 proceeds to 312. If the probabilistic classification at 306 and the semantic classification at 308 are equal, method 300 proceeds to 328, as will be described with respect to components of comparison process 304.

At 312, a categorization process categorizes both the probabilistic classification made at 306 and the semantic classification made at 308. For example, utilizing inheritance rules, a relative categorization of the probabilistic classification and the semantic classification with respect to genus/species can be made. In an embodiment, at 312, it is determined any parent (genus) classifications, as well as any child (species) classifications.

At 314, a final classification is obtained for each of the patent-related references. In an embodiment, the final classification can be obtained and subsequently stored in an appropriate database, such as database 104b, referring to FIG. 1. For example, referring again to FIG. 3, the classification can be stored 328 in a database, along with probability weights, keywords, and semantic structures of the reference. Such classification and weighting will be described further with respect to comparison process 304.

In an embodiment, the logical categorization of the reference is stored in a knowledgebase for further processing, as will be described further with respect to comparison process 304. For example, knowledgebase 330 is depicted in FIG. 3 as configured to store the logical categorization from 314.

At 316, preparation process 302 ends.

As described, method 300 further comprises comparison sub-process 304. In an embodiment, comparison sub-process generally comprises steps 318-326 with interfaces to database classification storage 328 and knowledgebase 330.

At 318, an input can be processed. In an embodiment, an input comprises at least one of an input patent, an invention disclosure, a patent application, or patent application draft, or any other suitable input for comparison against the set of patent-related references prepared in preparation process 302. As part of processing at 318, a semantic classification is conducted on the input. In an embodiment, the input can be processed using a semantic parsing or "reading." In an embodiment, a semantic understanding algorithm processes the input to determine a semantic classification similar to the semantic understanding algorithm at 308. As a result, concept extraction of the semantic engine extracts concepts in order to subsequently make an inference decision based on the resultant similarity of the weights of the concept meanings (as will be described).

At 320, once a semantic classification is obtained for the input, a query to the database is made. In an embodiment, the query returns all of the patent-related references having the same semantic and probabilistic classification as the input. As such, the processing of 320 interfaces to database classification storage 328.

At 322, comparison sub-process 304 interfaces with knowledgebase 330. In an embodiment, at 322, a comparison between the input and the logical categorizations of patent-related references from 314 is made. For example, the patent-related references having the same classification and/or categorization as the input can be semantically compared.

At 324, using an inference engine or inference sub-process, forward/backward chaining process is conducted. In an embodiment, forward/backward chaining determines the differences between the input and the selected set of patent-related references. For example, differences can be determined between the claims and description of two references following a "patent" format.

In other embodiments, differences between the input and the selected set of patent-related references can be generally obtained, without regard to sections.

At 326, a comparison result is displayed. As described herein, myriad display possibilities are possible based on the processes performed.

Figure 5:
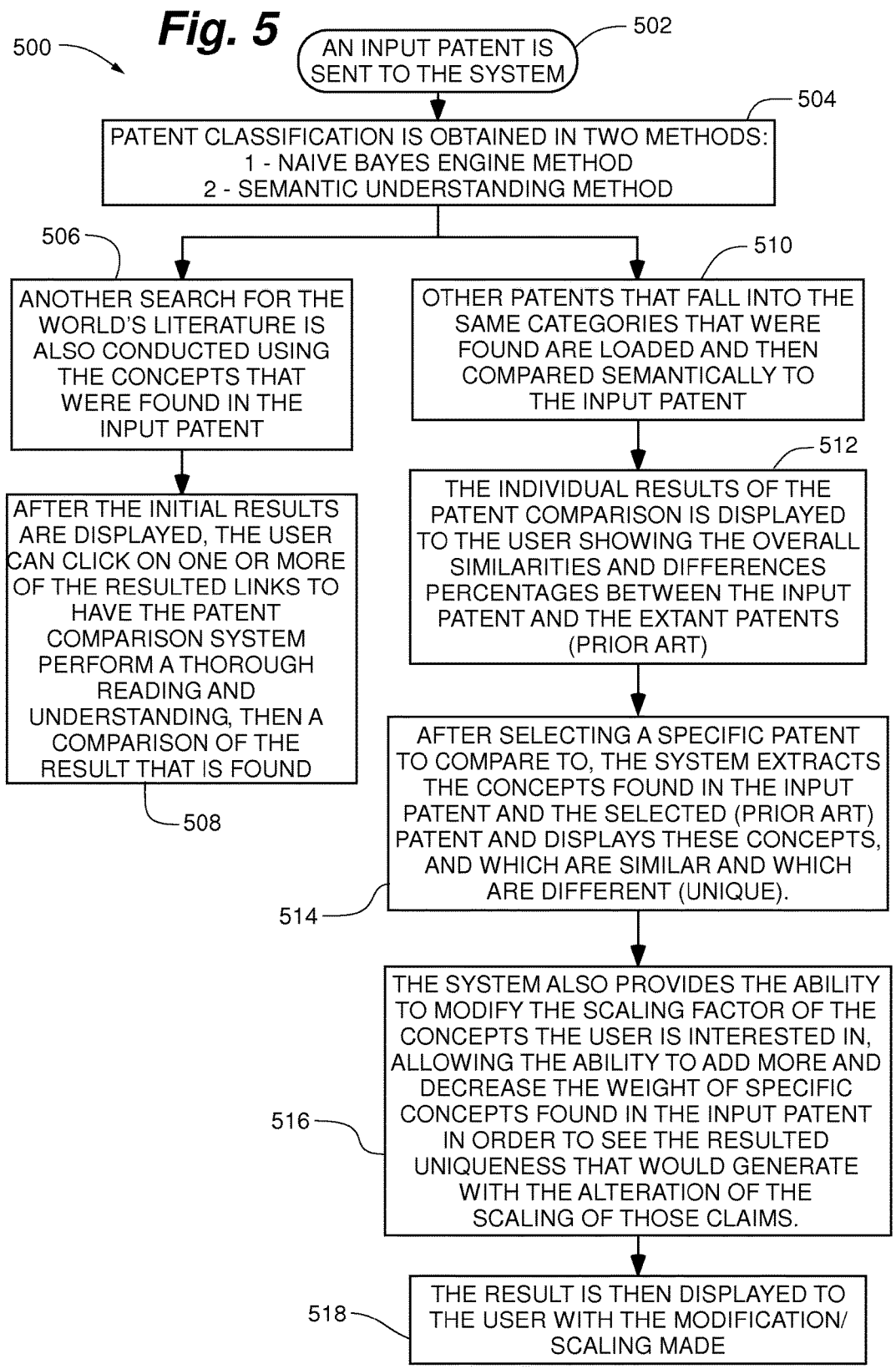
FIG. 5 is a flowchart of a method for comparing patent-related references, according to an embodiment.

Referring to FIG. 5, a flowchart of a method 500 for comparing patent-related references for a patent-specific input and a prior art collection of references is depicted, according to an embodiment.

At 502, an input patent is received by the system. For example, embodiments can provide for a selection or other transmission of the input patent.

At 504, as described herein, a two-step classification is performed on the input patent; a Naïve Bayes classification and a semantic understanding classification. From 504, method 500 can optionally branch to 506. In other embodiments, a primary procedure proceeds to 510 without branching to 506.

Figure 6:
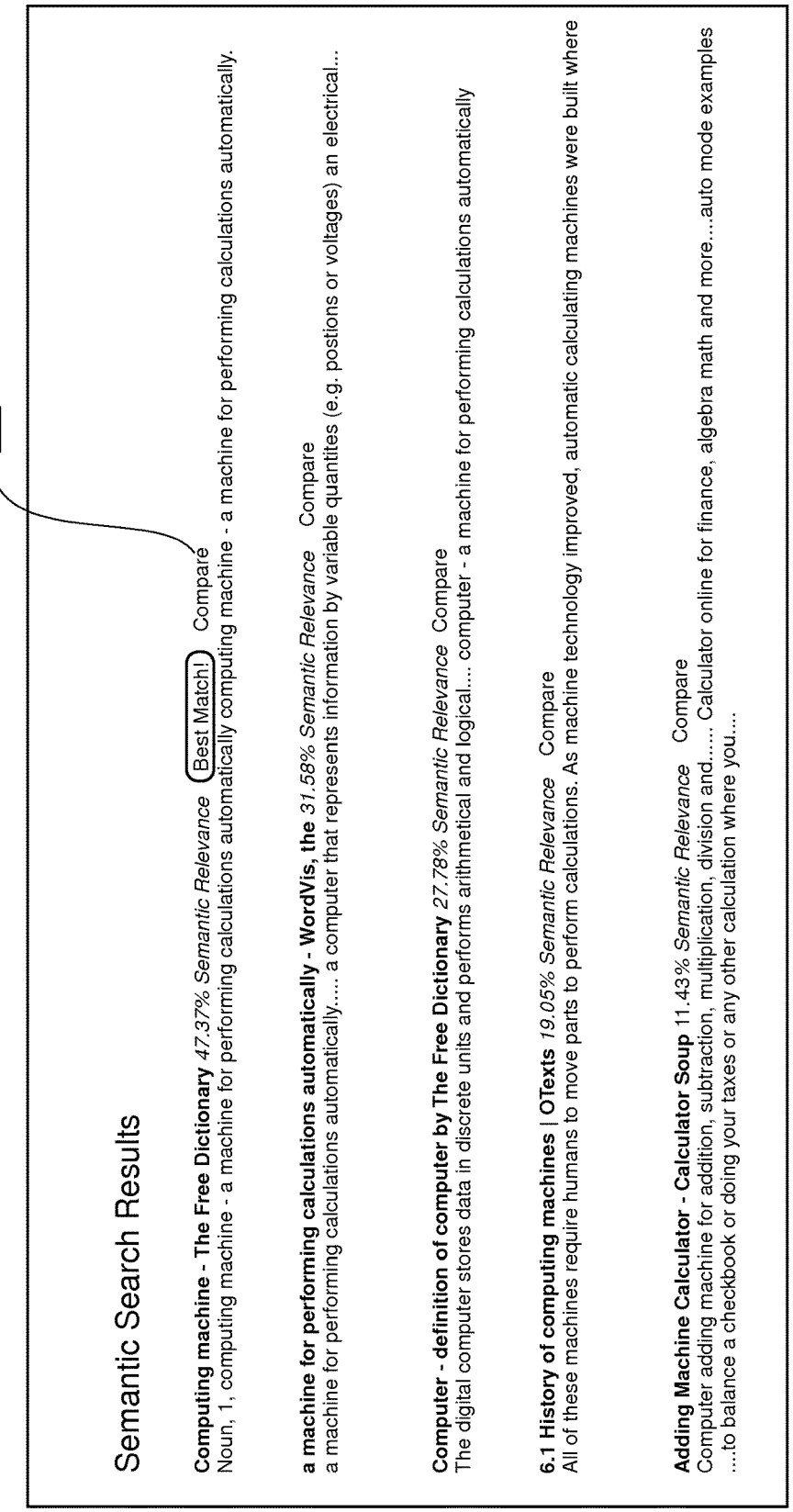
FIG. 6 is a screenshot of a semantic search results output for a patent-related reference comparison system, according to an embodiment.
Figure 7:
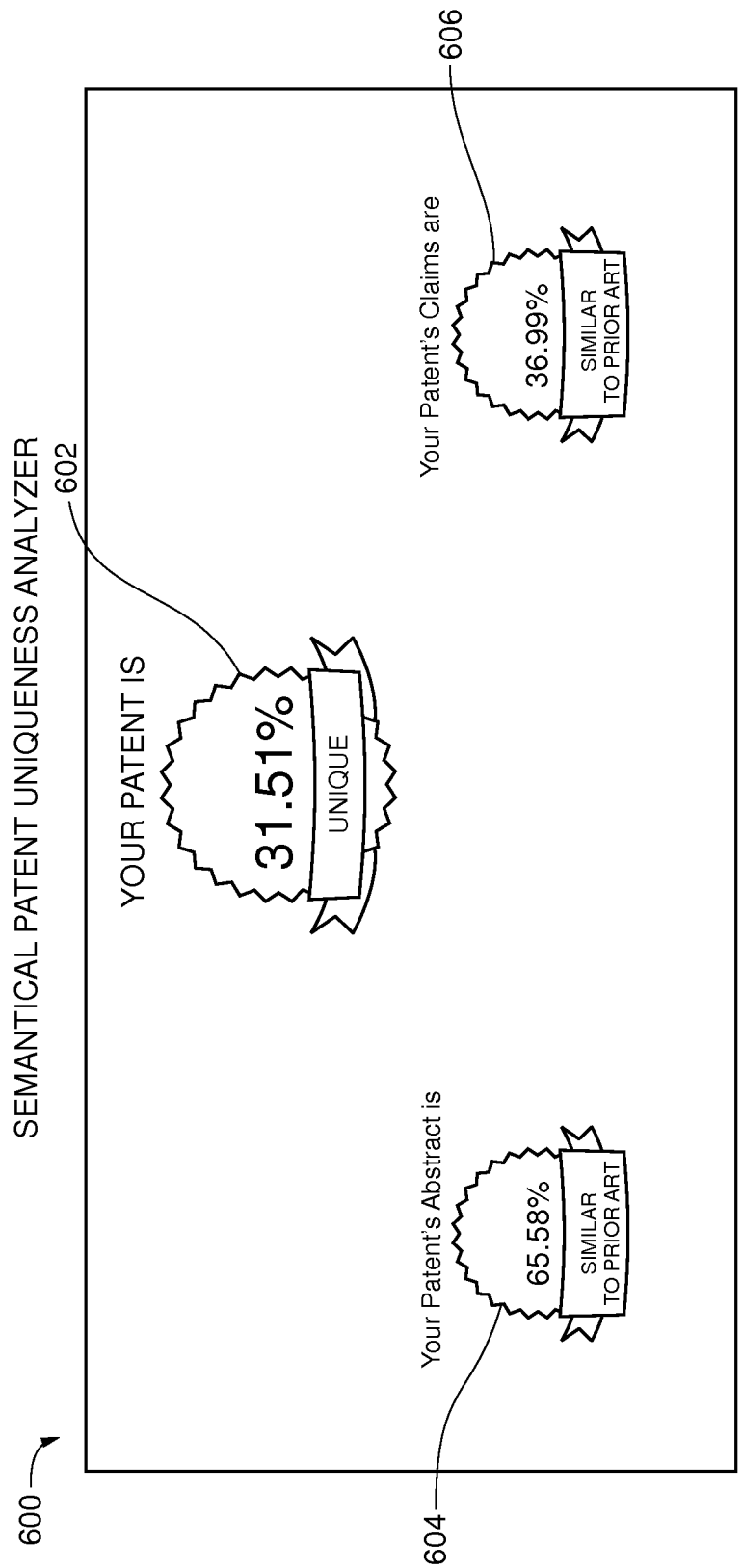
FIG. 7 is a screenshot of an output for a patent-related reference comparison system, according to an embodiment.

At 506, an optional search for literature, such as the domain of prior art relative to the input patent can be conducted. For example, at 506, a global search of literature using the concepts found in the input patent is conducted. Referring to FIG. 6, is a screenshot of the semantic search results output from 506 is depicted, according to an embodiment.

At 508, initial search results are displayed (for example, referring to results screen 550 in FIG. 6). Subsequently the user can select one or more of the resulting links to perform a semantic comparison. For example, the semantic "reading" and understanding described herein can be performed, and a comparison of the result can subsequently be output. Referring again to FIG. 6, link 552 can be selected for comparison of the input patent with the search result "Computing machine—The Free Dictionary," which was determined to be the best semantic search match from search 506.

Referring again to FIG. 5, at 510, other patents or references that were previously classified and determined to be in the same category or categories as the input patent are loaded and compared semantically to the input patent.

At 512, individual results of the comparison between the input patent and the extant patents (e.g. the prior art) are displayed to the user. In an embodiment, overall similarities and differences, including relative percentages can be displayed. For example, referring to FIG. 7, a screenshot of an output 600 is depicted, according to an embodiment. In an embodiment, output 600 comprises an overall 602 uniqueness or difference percentage. In embodiments, output 600 can further comprise sub-section differences, such as comparison of the abstract 604, or comparison of the claims 606.

Referring again to FIG. 5, at 514, a user can be prompted to select a particular reference for comparison, and after a selection is made, embodiments are configured to extract the concepts found in the input patent and the selected (prior art) reference. The extracted concepts can subsequently be displayed, including which are similar and which are different.

Figure 8:
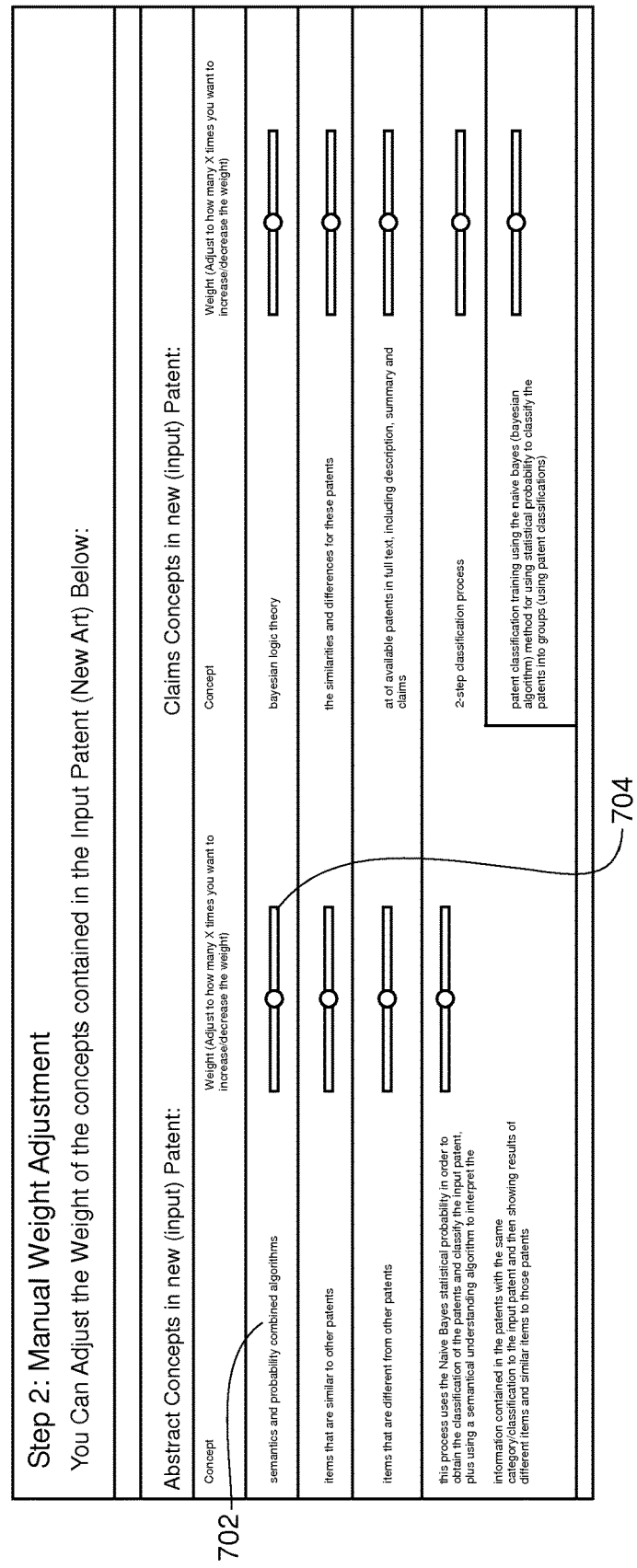
FIG. 8 is a screenshot of a weighting adjustment control panel for a patent-related reference comparison system, according to an embodiment.

At 516, embodiments are configured to modify the scaling factors of the concepts. For example, a user can relatively weight a particular concept over another concept, thereby refining the relative association of concepts between the input and extant references. The resulting uniqueness, or similarities, or differences can be generated based on relative weighting. For example, referring to FIG. 8, a screenshot of a weighting adjustment control panel 700 is depicted, according to an embodiment. Weighting adjustment control panel 700 can display the extracted concept 702. Further, weighting adjustment control panel 700 can display a weighting control 704 for each of the concepts. In embodiments, weighting control 704 comprises a slider bar. In other embodiments, weighting control 704 comprises a text input, radio button, or other suitable interface.

Figure 9:
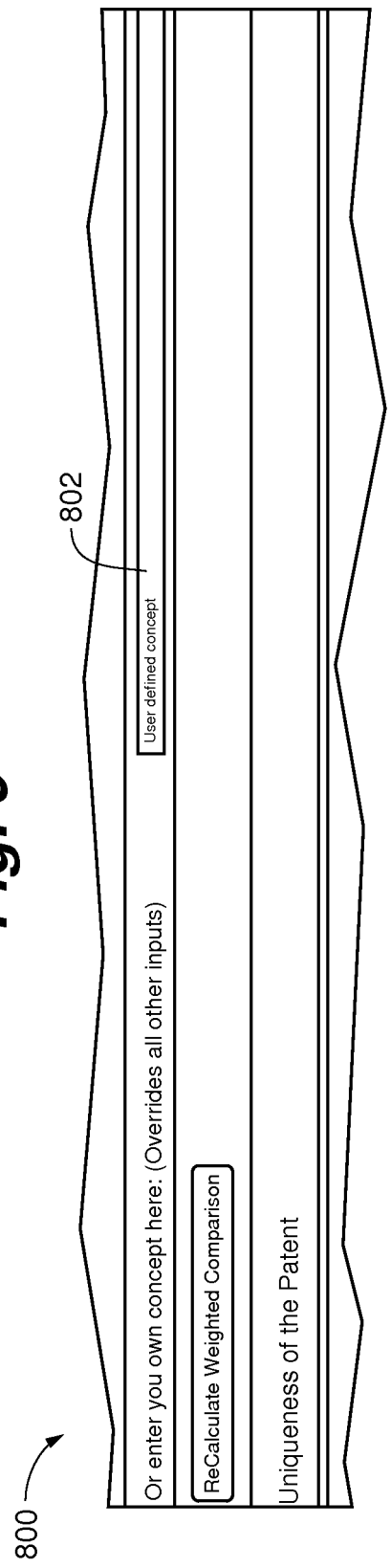
FIG. 9 is a screenshot of user-entered concept weighting area for a patent-related reference comparison system, according to an embodiment.

In another example, referring to FIG. 9, a screenshot of user-entered concept weighting area 800 is depicted, according to an embodiment. At 802, a user-defined concept can be entered in order to fundamentally weight that concept over any other semantically-identified concepts.

At 518, the results, including any scaling or concept weighting modifications can be displayed to the user.

Various embodiments of systems, devices, and methods have been described herein. These embodiments are given only by way of example and are not intended to limit the scope of subject matter hereof. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized commensurate with the scope of subject matter hereof.

Persons of ordinary skill in the relevant arts will recognize that subject matter hereof may comprise fewer features than illustrated in any individual embodiment described above. The embodiments described herein are not meant to be an exhaustive presentation of the ways in which the various features of subject matter hereof may be combined. Accordingly, the embodiments are not mutually exclusive combinations of features; rather, the subject matter hereof may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims of subject matter hereof, it is expressly intended that the provisions of Section 112, sixth paragraph of 35 U.S.C. are not to be invoked unless the specific terms "means for" or "step for" are recited in a claim.

The invention claimed is:

1. A semantic-probabilistic comparison engine for evaluating an input, the semantic-probabilistic comparison engine operably coupled to the Internet, a first database, and a second database, wherein a collection of references are published on the Internet, and the first and second databases are configured for storing data related to operation of the comparison engine, the comparison engine comprising:
    a processor and memory operably coupled to the processor; and
    control logic to be executed by the processor and configured to
        receive an input, the input comprising at least one of an invention disclosure, a draft patent application, a published patent application, or a granted patent,
        execute a preparation sub-engine without human intervention, the preparation sub-engine configured to
            selectively access the collection of references published on the Internet, wherein the collection of references are operably coupled to the processor over a network channel,
            evaluate each of the collection of references according to a Bayesian probabilistic algorithm to determine a probabilistic classification,
            evaluate each of the collection of references according to a semantic algorithm to determine a semantic classification, the semantic algorithm automatically analyzing the text of each of the references and determining a plurality of semantically-determined concepts for each of the references based on a relative understanding of the probabilistic classification,
            determine whether the probabilistic classification and the semantic classification are equal,
            when the probabilistic classification and the semantic classification are equal, store the probabilistic classification, the semantic classifications, a probability weight, at least one keyword, and at least one semantic structure in the second database,
            when the probabilistic classification and the semantic classification are not equal, categorize the probabilistic classification and the semantic classification according to a set of inheritance rules, and storing the categorization in the third database,
        execute a comparison sub-engine without human intervention, the comparison sub-engine configured to
            evaluate the input according to a semantic algorithm to determine an input semantic classification, the semantic algorithm further determining a plurality of semantically-determined concepts for the input,
            query the second database to return all of the references having the same semantic classification and probabilistic classification as the input semantic classification so relevant concepts from the plurality of semantically-determined concepts for each of the references are automatically matched with the plurality of semantically-determined concepts for the input,
            interface with the third database to semantically compare the categorizations of the input and returned references,
            execute forward/backward chaining to determine a relation between the input and each of the returned references, and
        execute a display sub-engine configured to
            present a dynamic scaling factor interface for the plurality of semantically-determined concepts found during the semantic classification of the input,
            receive a weighting adjustment relative to at least one of the plurality of semantically-determined concepts, the weighting adjustment including a refinement of a scaling factor for one of the semantically-determined concepts over a second of the semantically-determined concepts, and
            display each of the relations, wherein each relation is displayed according to a selective ranking relative to the other relations and the weighting adjustment to indicate an applicability to the input.

2. The semantic-probabilistic comparison engine of claim 1, wherein the relation is a difference between the input and one of the returned references or a similarity between the input and one of the returned references.

3. The semantic-probabilistic comparison engine of claim 1, wherein the relation is a summary of each of the relations between the input and the returned references.

4. The semantic-probabilistic comparison engine of claim 1, wherein the Bayesian probabilistic algorithm is a Naïve Bayes algorithm including a posterior probability defined by a likelihood and a prior probability.

5. The semantic-probabilistic comparison engine of claim 1, wherein the control logic is further configured to implement a search sub-engine, the search sub-engine configured to search for at least one key word in the input.

6. The semantic-probabilistic comparison engine of claim 5, wherein the sub-engine is configured to extract the meaning and concept of the at least one key word, wherein the comparison sub-engine is configured to receive as the input the meaning and concept of the at least one key word and search for the meaning and concept.

7. A system for semantic-probabilistic comparison of an input consisting of an invention disclosure, a draft patent application, a published patent application, or a granted patent, with a semantic-probabilistic comparison engine operably coupled to the Internet, a first database, and a second database, wherein a collection of references are published on the Internet, and the first and second databases are configured for storing data related to operation of the comparison engine, the system comprising:
    means for receiving the input;
    means for selectively accessing the collection of references published on the Internet, wherein the collection of references are operably coupled to the processor over a network channel;
    means for evaluating each of the collection of references according to a Bayesian probabilistic algorithm to determine a probabilistic classification;
    means for evaluating each of the collection of references according to a semantic algorithm to determine a semantic classification, the semantic algorithm automatically analyzing the text of each of the references and determining a plurality of semantically-determined concepts for each of the references based on a relative understanding of the probabilistic classification;

means for determining whether the probabilistic classification and the semantic classification are equal;

when the probabilistic classification and the semantic classification are equal, means for storing the probabilistic classification the semantic classification, a probability weight, at least one keyword, and at least one semantic structure in the second database;

when the probabilistic classification and the semantic classification are not equal, means for categorizing the probabilistic classification and the semantic classification according to a set of inheritance rules, and means for storing the categorization in the third database;

means for evaluating the input according to a semantic algorithm to determine an input semantic classification, the semantic algorithm further determining a plurality of semantically-determined concepts for the input;

means for querying the second database to return all of the references having the same semantic classification and probabilistic classification as the input semantic classification so relevant concepts from the plurality of semantically-determined concepts for each of the references are automatically matched with the plurality of semantically-determined concepts for the input;

means for interfacing with the third database to semantically compare the categorizations of the input and returned references;

means for executing forward/backward chaining to determine a relation between the input and each of the returned references;

means for presenting a dynamic scaling factor interface for the plurality of semantically-determined concepts found during the semantic classification of the input, means for receiving a weighting adjustment relative to at least one of the plurality of semantically-determined concepts, the weighting adjustment including a refinement of a scaling factor for one of the semantically-determined concepts over a second of the semantically-determined concepts; and means for displaying each of the relations, wherein each relation is displayed according to a selective ranking relative to the other relations and the weighting adjustment to indicate an applicability to the input.

8. The system of claim 7, wherein the relation is a difference between the input and one of the returned references or a similarity between the input and one of the returned references.

9. The system of claim 7, wherein the relation is a summary of each of the relations between the input and the returned references.

10. The system of claim 7, wherein the Bayesian probabilistic algorithm is a Naïve Bayes algorithm including a posterior probability defined by a likelihood and a prior probability.

11. The system of claim 7, further comprising means for searching for at least one key word in the input.

12. The system of claim 11, further comprising:

means for extracting the meaning and concept of the at least one key word, and means for receiving as the input the meaning and concept of the at least one key word, wherein the means for searching are further configured to search for the meaning and concept.

\* \* \* \* \*